US011320940B2

(12) United States Patent
Joo et al.

(10) Patent No.: US 11,320,940 B2
(45) Date of Patent: May 3, 2022

(54) TOUCH CONTROL DEVICE AND VEHICLE HAVING THE SAME

(71) Applicants: HYUNDAI MOTOR COMPANY, Seoul (KR); KIA MOTORS CORPORATION, Seoul (KR); SEOYON ELECTRONICS CO., LTD., Suwon-si (KR)

(72) Inventors: Sihyun Joo, Seoul (KR); Nae Seung Kang, Siheung-si (KR); Jungsang Min, Seoul (KR); Jongmin Oh, Suwon-si (KR); Sam Min Park, Incheon (KR); Jun Sam Choi, Anyang-si (KR)

(73) Assignees: HYUNDAI MOTOR COMPANY, Seoul (KR); KIA MOTORS CORPORATION, Seoul (KR); SEOYON ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/213,911

(22) Filed: Dec. 7, 2018

(65) Prior Publication Data
US 2019/0204951 A1 Jul. 4, 2019

(30) Foreign Application Priority Data

Dec. 28, 2017 (KR) .................. 10-2017-0182335

(51) Int. Cl.
*G06F 3/044* (2006.01)
*G06F 3/041* (2006.01)
*G06F 3/0354* (2013.01)

(52) U.S. Cl.
CPC .......... *G06F 3/044* (2013.01); *G06F 3/03547* (2013.01); *G06F 3/0443* (2019.05);
(Continued)

(58) Field of Classification Search
CPC .... G06F 3/044; G06F 3/0446; G06F 3/04164; G06F 3/0443; G06F 3/03547; G06F 2203/04103; G06F 2203/04111
See application file for complete search history.

(56) References Cited

U.S. PATENT DOCUMENTS 10,483,057 B2   11/2019  Sawada et al.
10,824,262 B2   11/2020  Kwon et al.
(Continued)

FOREIGN PATENT DOCUMENTS

EP      0940652 A2 *  9/1999  ............. G01B 7/004
KR   20060073614 A    6/2006
(Continued)

OTHER PUBLICATIONS

Office Action cited in corresponding Korean patent application No. 10-2017-0182335; dated Oct. 22, 2021; 13 pp.

*Primary Examiner* — Carolyn R Edwards
*Assistant Examiner* — Eboni N Giles
(74) *Attorney, Agent, or Firm* — Lempia Summerfield Katz LLP

(57) ABSTRACT

Disclosed is a touch control device. The touch control device includes a touch panel having a curved surface shape of multiple curvatures. The touch control device includes a base including a metal complex, an electrode groove formed in a touch area of the base, a plurality of sensor electrodes formed on the electrode groove, each including a conductive material, a via hole penetrating the base, a connection electrode connecting the plurality of sensor electrodes through the via hole and an integrated circuit coupled to the base and connected to the sensor electrodes to sense a change in capacitance of the sensor electrodes.

8 Claims, 9 Drawing Sheets

(52) U.S. Cl.
CPC ........ *G06F 3/0446* (2019.05); *G06F 3/04164* (2019.05); *G06F 2203/04103* (2013.01); *G06F 2203/04111* (2013.01)

(56) References Cited

U.S. PATENT DOCUMENTS

| | | | | |
|---|---|---|---|---|
| 2003/0121767 | A1* | 7/2003 | Caldwell | G09F 3/204 200/512 |
| 2005/0052426 | A1* | 3/2005 | Hagermoser | B60K 35/00 345/173 |
| 2010/0026532 | A1* | 2/2010 | Shimizu | G06F 3/0202 341/35 |
| 2012/0325639 | A1* | 12/2012 | Scuderi | G06F 3/0446 200/600 |
| 2013/0001058 | A1* | 1/2013 | Bowler | H03K 17/962 200/600 |
| 2014/0251661 | A1* | 9/2014 | Cok | G02B 6/138 174/253 |
| 2017/0102818 | A1* | 4/2017 | Ahn | G06F 3/044 |
| 2017/0147130 | A1 | 5/2017 | Kwon et al. | |
| 2017/0269768 | A1* | 9/2017 | Shin | G06F 3/0338 |
| 2017/0316901 | A1 | 11/2017 | Sawada et al. | |
| 2019/0037694 | A1* | 1/2019 | Koo | H05K 1/028 |
| 2019/0080864 | A1* | 3/2019 | Sawada | H01H 19/08 |
| 2019/0138136 | A1* | 5/2019 | Nakayama | G06F 3/044 |

FOREIGN PATENT DOCUMENTS

| | | |
|---|---|---|
| KR | 10-2017-0032769 A | 3/2017 |
| KR | 10-2017-0032830 A | 3/2017 |
| KR | 20170058745 A | 5/2017 |
| WO | 2016075907 A1 | 5/2016 |

* cited by examiner

TOUCH CONTROL DEVICE AND VEHICLE HAVING THE SAME

CROSS-REFERENCE TO RELATED APPLICATION

This application claims priority to and the benefit of Korean Patent Application No. 10-2017-0182335, filed on Dec. 28, 2017, the disclosure of which is incorporated herein by reference in its entirety.

BACKGROUND

1. Field

The present disclosure relates to a touch control device and vehicle having the same, and more particularly, to a touch control device with electrodes installed by a laser process and vehicle having the touch control device.

2. Description of Related Art

A touch control device is one of the devices that configure interfaces between an information and communication terminal with many different displays and a user. The touch control device enables human-terminal interface when the user directly contacts or approaches a touch pad or touch screen using an input tool, such as his/her finger or a touch pen.

To implement a touch control device capable of being manipulated by touch, resistive, capacitive, surface acoustic wave, transmitter methods, etc., are used. The touch control device using the capacitive method includes a type that forms crossing electrode patterns and detects an input position by sensing a change in capacitance between electrodes when an input means, such as a finger comes into contact with the touch control device. There is another type that applies the same electric potential of a phase to both terminals of a transparent conductive film and detects an input position by sensing a small current that flows when a capacitance is formed by an input means, such as a finger coming into contact with or approaching the touch control device.

The disclosure of this section is to provide background of the invention. Applicant notes that this section may contain information available before this application. However, by providing this section, Applicant does not admit that any information contained in this section constitutes prior art.

SUMMARY

A touch control device having various shapes has been proposed. For example, a touch control device can be a curved surface. However, Printed circuit board (PCB) type touch control devices may not be applied to a multi-curved surface (a curved surface having two or more different curvatures) due to a difference in height between a center and an outline thereof when an overlay having a curved surface having multiple curvatures is attached to an upper surface of the printed circuit board. In addition, film type (ITO, metal mesh, flexible printed circuit board) touch control devices are difficult to implement various curvatures and a curved surface of different curvatures.

One aspect of the present disclosure provides a touch control device including a touch panel having a curved surface shape of multiple curvatures and a vehicle having the touch control device.

Another aspect of the present disclosure provides a touch control device having a touch panel with improved design freedom and a vehicle having the touch control device.

Another aspect of the present disclosure provides a touch control device with improved productivity by simplifying the manufacturing process and a vehicle having the touch control device.

Another aspect of the present disclosure provides a touch control device capable of uniformly bonding an overlay to a touch panel by removing bubbles generated between the touch panel and the overlay, and a vehicle having the touch control device.

Another aspect of the present disclosure provides a touch control device to which overlays of various materials can be attached and a vehicle having the touch control device.

In accordance with one aspect of the present disclosure, a touch control device comprises a base including a metal complex; an electrode groove formed in a touch area of the base; a plurality of sensor electrodes formed on the electrode groove, the plurality of sensor electrodes each including a conductive material; a via hole penetrating the base; a connection electrode connecting the plurality of sensor electrodes through the via hole; and an integrated circuit coupled to the base and connected to the sensor electrodes to sense a change in capacitance of the sensor electrodes.

The plurality of sensor electrodes may include first sensor electrodes directly connected to one surface of the base and second electrodes separated from the one surface of the base.

The connection electrode may be formed on the other surface of the base and connects the second sensor electrodes.

The second sensor electrodes and the connection electrode may be connected through the via hole.

The connection electrode may include a first terminal electrode configured to connect the first sensor electrodes and the integrated circuit and a second terminal electrode configured to connect the second sensor electrodes and the integrated circuit.

The first sensor electrodes may be connected along a first direction and the second sensor electrodes are separated along the first direction and a second direction crossing the first direction.

The first sensor electrodes may be disposed to cross the second sensor electrodes along the second direction.

The connection electrode may be formed in the electrode groove by a plating process or a deposition process.

The sensor electrode may be formed on an upper surface or a lower surface of the base and the connection electrode is formed on a lower surface or an upper surface of the base.

The touch control device may further comprise an overlay configured to cover an upper surface of the base.

The overlay may include a non-metallic material.

Bubbles generated between the overlay and the base may pass through the via hole.

The touch area of the base may include a curved surface shape of different curvatures.

In accordance with another aspect of the present disclosure, a vehicle comprises the touch control device, a display device and a processor configured to operate the display device according to an input signal input to the touch control device.

The touch control device may be installed on at least one of a gear box, a steering wheel, and a center fascia.

BRIEF DESCRIPTION OF THE DRAWINGS

Features of the invention will become apparent and more readily appreciated from the following description of the embodiments, taken in conjunction with the accompanying drawings of which.

DETAILED DESCRIPTION OF EMBODIMENTS

Figure 1:
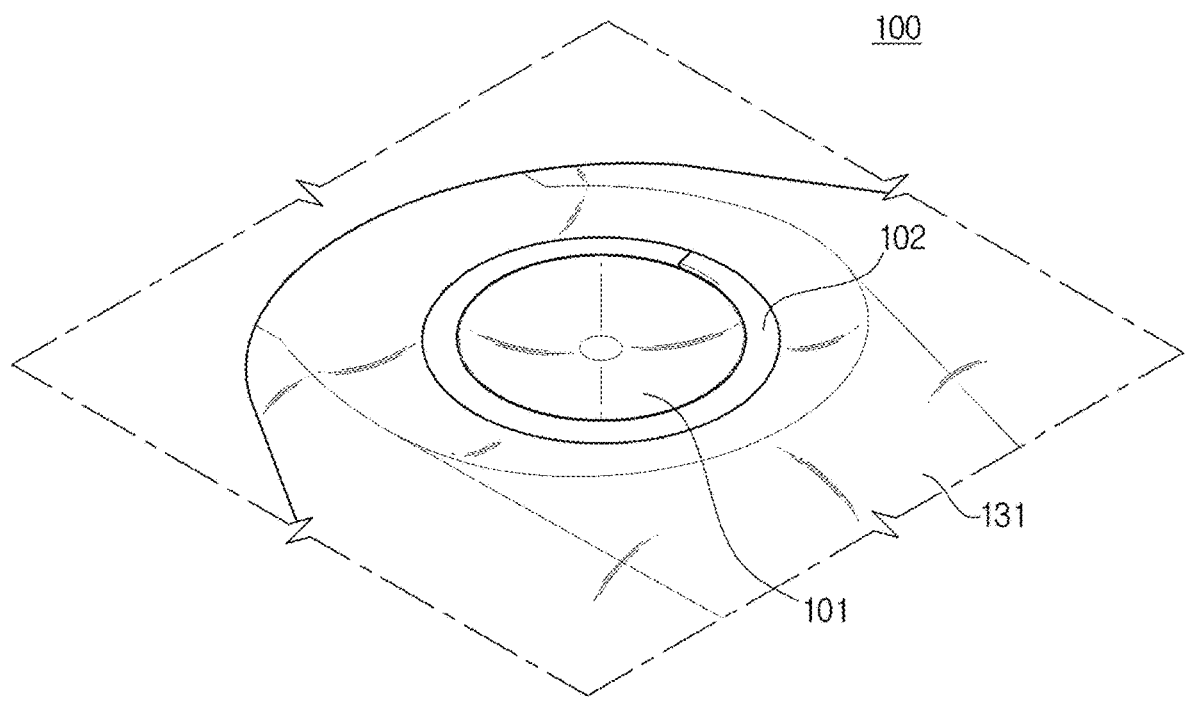
FIG. 1 is a view illustrating a touch control device according to an embodiment of the present disclosure.

The embodiments described herein and the configurations shown in the drawings are only examples of preferred embodiments of the present invention, and various modifications may be made at the time of filing of the present application to replace the embodiments and drawings of the present specification.

In addition, the same reference numerals or symbols shown in the drawings of the present specification indicate components or components that perform substantially the same function.

Also, the terms used herein are used to illustrate the embodiments and are not intended to limit the disclosed invention. The singular forms "a," "an," and "the" include plural referents unless the context clearly dictates otherwise.

In this specification, the terms "comprise," "having," and the like are used to specify that a feature, a number, a step, an operation, an element, a component, or a combination thereof, but do not preclude the presence or addition of one or more features, integers, steps, operations, elements, components, or combinations thereof.

It is also to be understood that terms including ordinals such as "first," "second" and the like used herein may be used to describe various elements, but the elements are not limited to the terms and used only for the purpose of distinguishing one component from another. For example, the first component may be referred to as a second component, and similarly, the second component may also be referred to as a first component. The term "and/or" includes any combination of a plurality of related listed items or any of the plurality of related listed items.

The terms "front," "rear," "upper" and "lower" used in the following description are defined based on the drawings, and the shape and position of each component are not limited by these terms.

In the following description, a vehicle refers to various devices that move a vehicle body, such as a human being, a thing, or an animal, from a departure point to a destination. Vehicles may include vehicles that run on roads or tracks, ships that move over the sea or river, and airplanes that fly through the sky using air.

Further, a vehicle running on a road or a track can move in a predetermined direction in accordance with the rotation of at least one wheel, and can include a three-wheeled or four-wheeled vehicle, a construction machine, a two-wheeled vehicle, a prime mover, bicycles and trains running on a track.

Hereinafter, embodiments according to the present invention will be described in detail with reference to the accompanying drawings.

FIG. 1 is a view illustrating a touch control device according to an embodiment of the present disclosure.

A touch control device 100 according to the embodiment of the present disclosure may include a touch unit 101.

The touch unit 101 may be formed in a certain area capable of receiving a touch signal of the user. For example, as shown in the drawings, the touch unit 101 may be provided in a concave curved surface shape of different curvatures. Alternatively, the touch unit 101 may be provided in a convex curved surface shape of different curvatures, and may not be limited thereto. Curvatures may be provided larger than that shown in the drawings. Further, the touch unit 101 may be provided not as a curved surface but as a polygonal surface. In addition, although the touch unit 101 is illustrated as being circular, the touch unit 101 may be polygonal or elliptical.

The touch unit 101 may be a touch pad to which a signal is input when the user contacts it with a pointer, such as his/her finger or a touch pen. The user may input a desired instruction or command by inputting a predetermined touch gesture to the touch unit 101.

Recognizing the pointer's position while the pointer is not contacting but approaching the touch pad is called 'proximity touch,' and recognizing the pointer's position when the pointer contacts the touch pad is called 'contact touch.' Proximity touch is made by recognizing a position on the touch pad vertically corresponding to a position in the air where the pointer approaches the touch pad.

The touch unit 101 may use capacitive methods.

Figure 9:
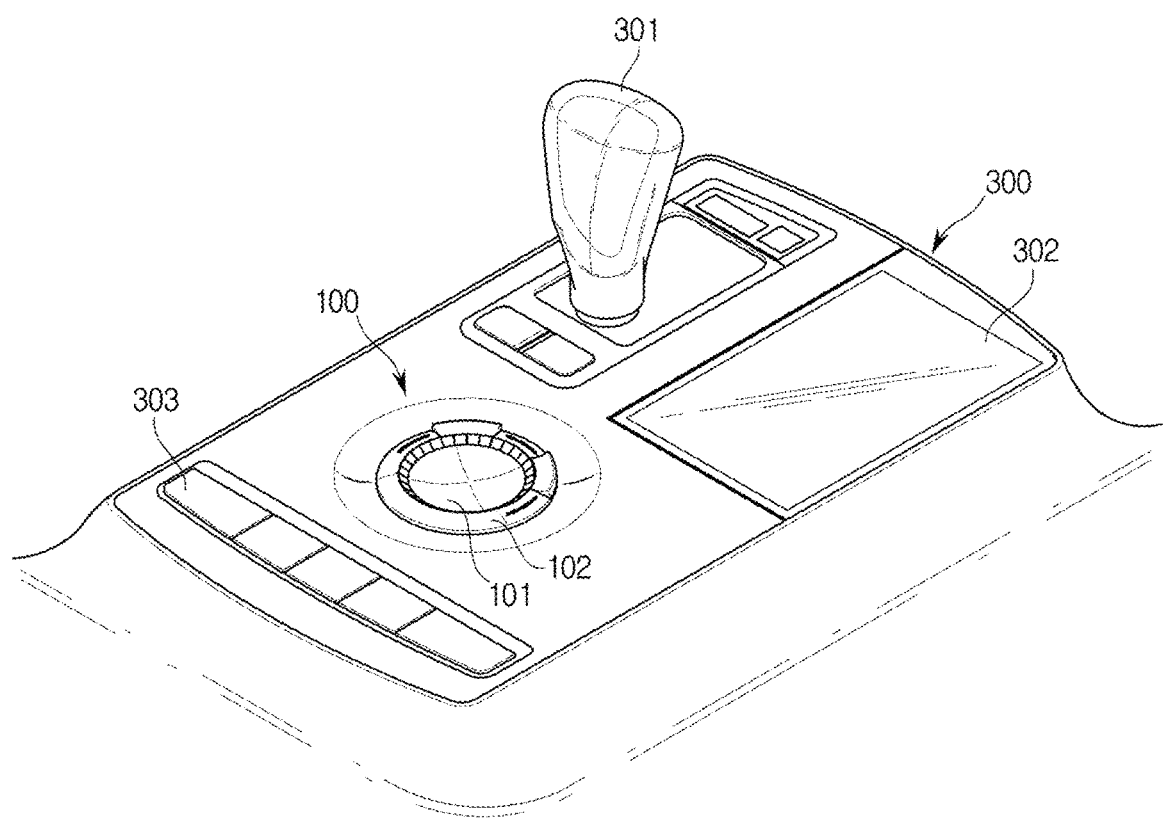
FIG. 9 is a perspective view illustrating a gear box equipped with the touch control device according to the embodiment of the present disclosure.

The touch unit 101 may be installed on the inner side of a border part 102. The border part 102 may refer to a part that encloses the touch unit 101, and may be formed of a separate member from that of the touch unit 101. As shown in FIG. 9, gradations that can be felt by the sense of touch are formed on the border part 102, so that the user can intuitively know a swype angle (or distance). Therefore, by making it possible to input different signals according to the swype angles (or distances), the degree of freedom of manipulation can be improved, and the input accuracy can be improved.

As described above, the border part 102 may be provided to receive a swype input of the user. The touch unit 101 may be provided to receive a gesture input of the user. The swype input denotes an action of inputting a gesture clockwise or counterclockwise without taking the pointer off the border part 102. The gesture input denotes an action of inputting a straight line or a curved line gesture without taking the pointer off the touch unit 101.

Figure 2:
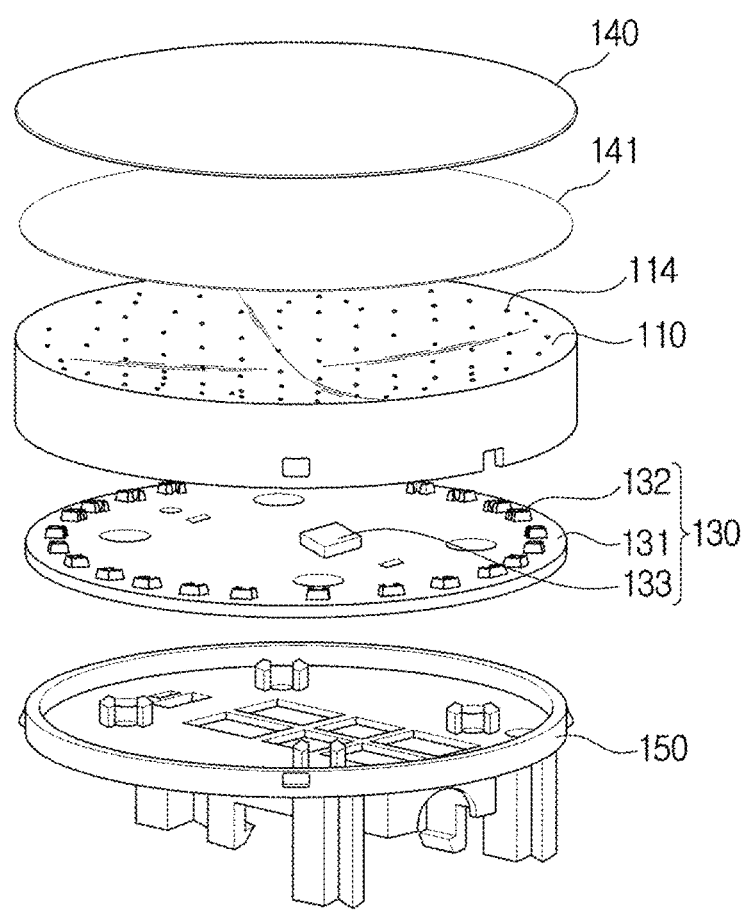
FIG. 2 is an exploded perspective view of the touch control device according to the embodiment of the present disclosure.

FIG. 2 is an exploded perspective view of the touch control device according to the embodiment of the present disclosure.

As shown in FIG. 2, the touch control device 100 according to the embodiment of the present disclosure includes a base 110 having a metal complex, electrode grooves 113a, 113b, 113c formed in a touch area 111 of the base 110 (see FIG. 6), sensor electrodes 120 formed on the electrode grooves 113 by a plating or deposition process, via holes 114 penetrating the base 110, connection electrodes 123 connecting the sensor electrodes 120 through the via holes 114 and an integrated circuit 130 coupled to the base 110 and connected to the sensor electrodes 120 to sense a change in capacitance of each of the sensor electrodes 120.

The base 110 may include a metal complex. This is to form the sensor electrodes 120 by the LDS (Laser Directing Structure) method. The LDS method refers to a method of forming a conductive structure in a region of a support member exposed to a laser by forming the support member with a material including a non-conductive and chemically stable metal complex, exposing a metal seed by exposing a portion of the supporting member to a laser, such as an Ultra Violet (UV) laser or Excimer laser to break the chemical bond of the metal complex, and metalizing the supporting member.

The base 110 may include the touch area 111 used as a touch pad and a peripheral portion 112 extending downward from an outer edge of the touch area 111.

The electrode grooves 113 may be formed in the touch area 111 of the base 110. The electrode grooves 113 may be formed by irradiating the base 110 with a laser. The electrode grooves 113 may be formed on an upper surface and a lower surface of the touch area 111, respectively. This is to form the sensor electrodes 120 and the connection electrodes 123 by a plating or deposition process.

The sensor electrodes 120 or the connection electrodes 123 may be formed on the electrode grooves 113 after a plating or deposition process.

That is, the sensor electrodes 120 (see FIG. 3) may be formed on the base 110 using the LSD (Laser Directing Structure) method.

The sensor electrodes 120 include a conductive material and may be metal, for example. Copper (Cu) may be used among metals in consideration of conductivity and cost. The sensor electrodes 120 may be formed of metal such as gold (Au) in addition to copper.

The via holes 114 may be formed at the touch area 111 of the base 110. A plurality of the via holes 114 may be formed throughout the touch area 111. The via holes 114 may be formed before irradiating the base 110 with a laser. That is, the via holes 114 may be formed together with the base 110 when the base 110 is manufactured by injection molding or the like.

The via holes 114 may be in contact with the sensor electrodes 120. Considering the process order, the sensor electrodes 120 may be formed on the via holes 114.

The via holes 114 may connect the sensor electrodes 120 which are separated from each other. For this, the connection electrodes 123 may be formed on the bottom surface of the base 110. A detailed description thereof will be described later.

The integrated circuit 130 may be coupled to the bottom of the base 110. The integrated circuit 130 includes a printed circuit board 131, terminal portions 126 disposed at a predetermined distance from the printed circuit board 131 along an edge of the printed circuit board 131, and a sensor IC 133 mounted on the printed circuit board 131. When the integrated circuit 130 is coupled to the base 110, the terminal portions 126 are connected to terminal electrodes 124 and 125, and the sensor electrodes 120 are electrically connected to the sensor IC 133.

A support unit 150 may be provided under the base 110 and the integrated circuit 130. The support unit 150 may be configured to fix the base 110 and the integrated circuit 130, and is not an essential component. The support unit 150 may be configured to fix the touch control device 100 at a specific position such as the inside of a vehicle.

Figure 3:
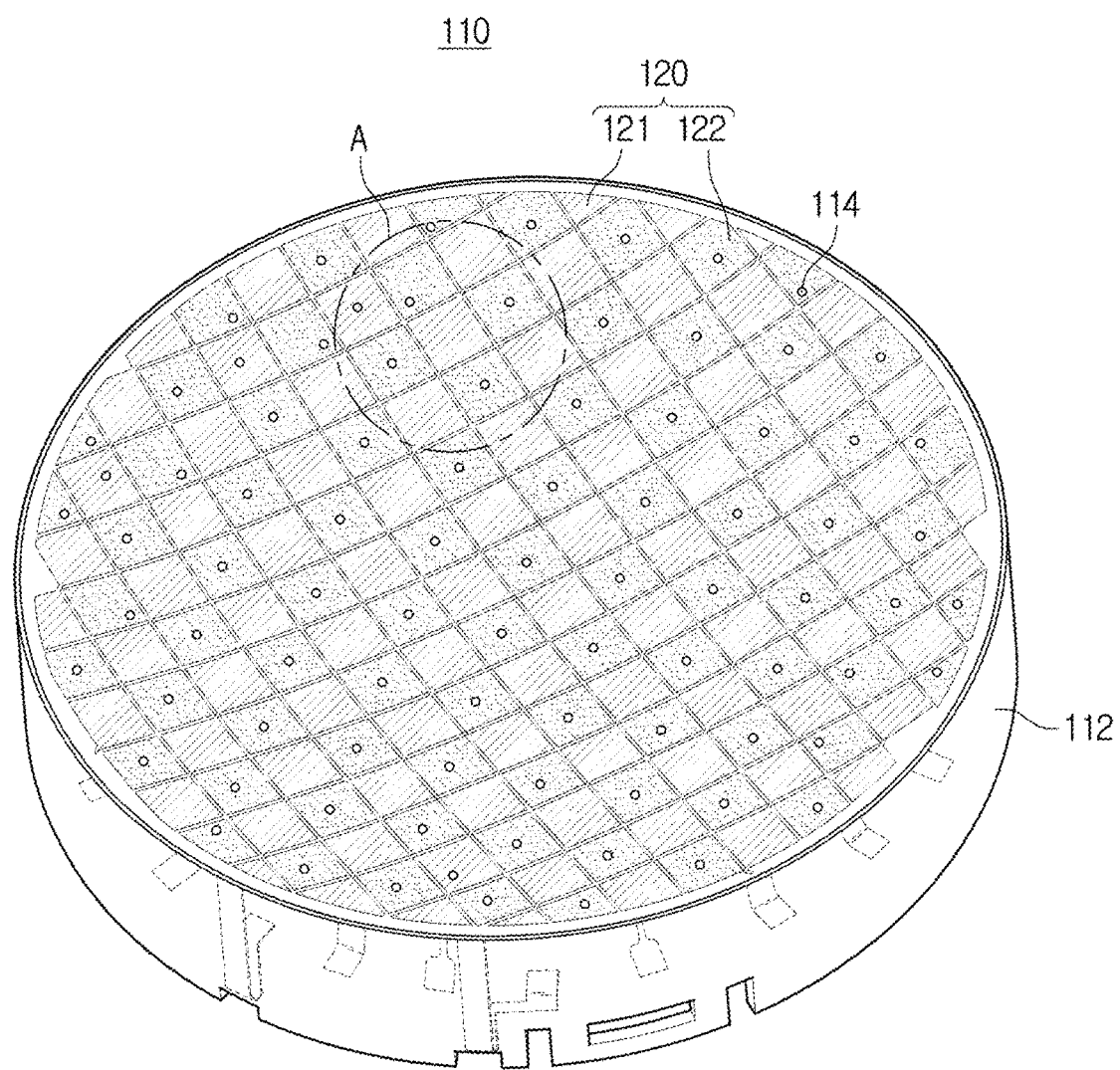
FIG. 3 is a view illustrating a base of the touch control device according to the embodiment of the present disclosure.
Figure 4:
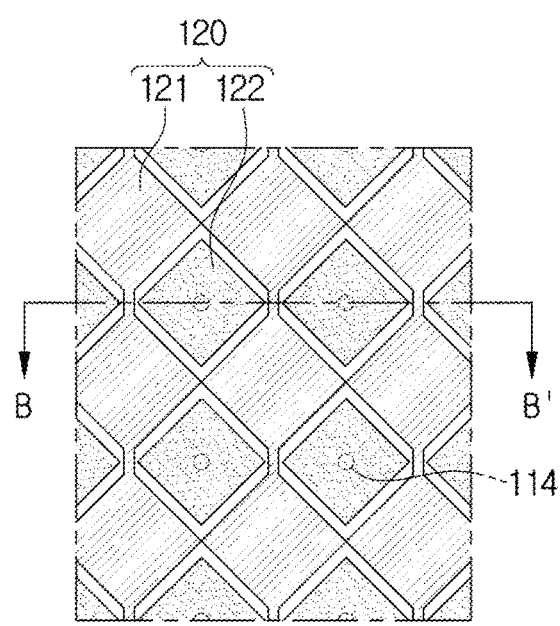
FIG. 4 is an enlarged view of 'A' shown in FIG. 3.
Figure 5:
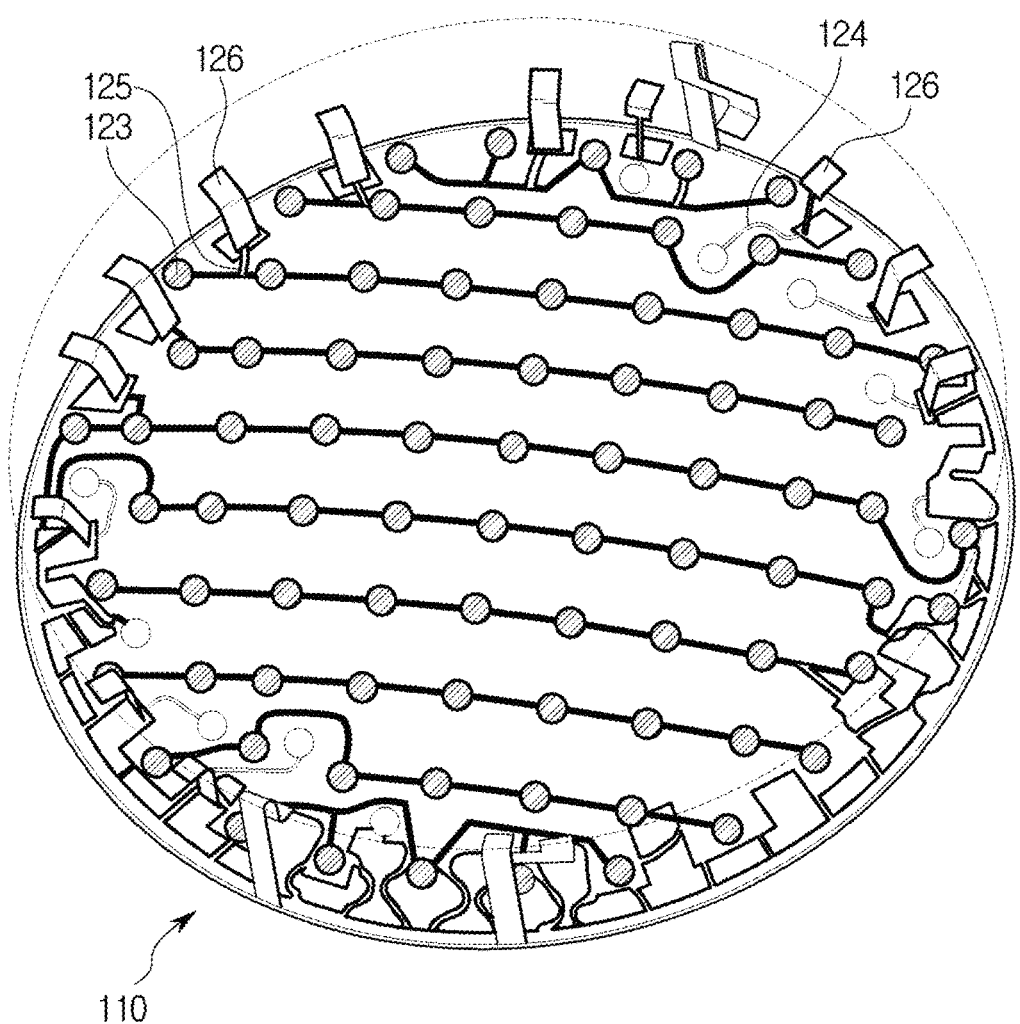
FIG. 5 is a bottom view of the base shown in FIG. 3.
Figure 6:
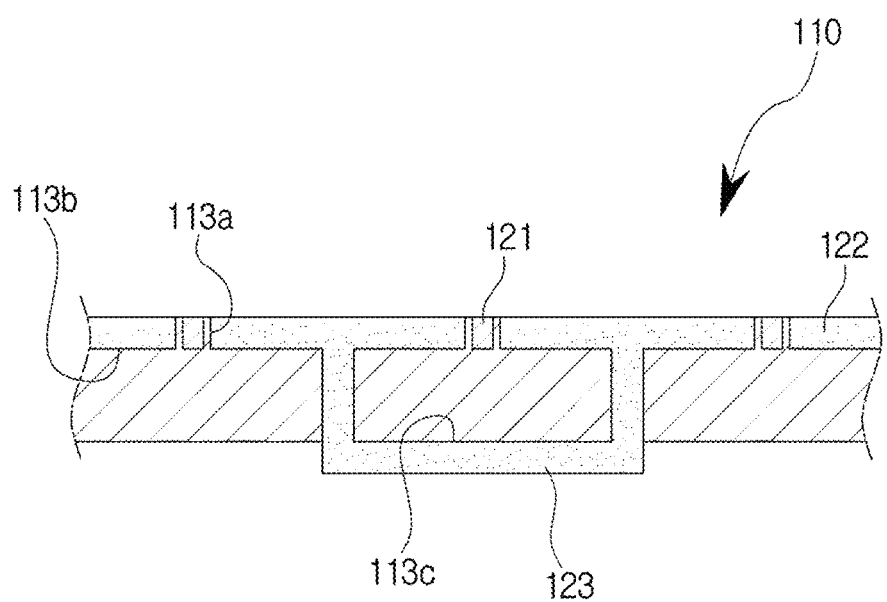
FIG. 6 is a cross-sectional view taken along line B-B' of FIG. 4.

FIG. 3 is a view illustrating a base of the touch control device according to the embodiment of the present disclosure and FIG. 4 is an enlarged view of 'A' shown in FIG. 3 and FIG. 5 is a bottom view of the base shown in FIG. 3 and FIG. 6 is a cross-sectional view taken along line B-B' of FIG. 4.

The sensor electrodes 120 of the present disclosure will be described in detail with reference to FIG. 3 to FIG. 6.

According to the embodiment of the present disclosure, the sensor electrodes 120 may be formed on the upper surface of the touch area 111 of the base 110. As described later, the sensor electrodes 120 may be formed on the lower surface of the touch area 111. In this case, a distance between the sensor electrodes 120 and the pointer is increased by a thickness of the base 110. Therefore, it is preferable that the sensor electrodes 120 are formed on the upper surface of the base 110.

The sensor electrodes 120 may be formed on the upper surface of the base 110 using the LDS (Laser Directing Structure) method as described above.

The sensor electrodes 120 may include first sensor electrodes 121 directly connected to the upper surface of the base 110 and second sensor electrodes 122 separated from the upper surface of the base 110. The first sensor electrodes 121 may be formed on first electrode grooves 113a (see FIG. 6) formed on the upper surface of the base 110 by a plating or deposition process. The second sensor electrodes 122 may be formed on second electrode grooves 113b (see FIG. 6) formed on the upper surface of the base 110 by a plating or deposition process.

The first sensor electrodes 121 may be transmitting electrodes (TX electrodes), and the second sensor electrodes 122 may be receiving electrodes (RX electrodes). Alternatively, the first sensor electrodes 121 may be receiving electrodes (RX electrodes), and the second sensor electrodes 122 may be transmitting electrodes (TX electrodes).

The first sensor electrodes 121 may be directly connected to the upper surface of the base 110. The first sensor electrodes 121 may be connected to each other even if separate connection electrodes are not provided. The first sensor electrodes 121 may be connected to each other along the first direction. The first sensor electrodes 121 are not connected to each other along the second direction perpendicular to the first direction. That is, the first sensor electrodes 121 may be separated from each other in the second direction.

The second sensor electrodes 122 may be separated from each other on the upper surface of the base 110. The second sensor electrodes 122 may be separated not only in the first direction but also in the second direction perpendicular to the first direction.

The first sensor electrodes 121 and the second sensor electrodes 122 may be disposed in a crossing manner along the second direction. That is, the first sensor electrodes 121 and the second sensor electrodes 122 may be alternately arranged along the second direction.

The via holes 114 may be formed on lower surfaces of the second sensor electrodes 122. According to the manufacturing process sequence of the touch control device 100, since the via holes 114 are formed together with the base 110 and the sensor electrodes 120 are formed on the base using the LDS method, the second sensor electrodes 122 are formed on upper surfaces of the via holes 114.

The second sensor electrodes 122 may be connected to each other through the via holes 114. Specifically, the second sensor electrodes 122 separated from each other may be connected by the connection electrodes 123 formed on the lower surface of the base 110. The connection electrodes 123 may be formed on third electrode grooves 113c (see FIG. 6) formed on the lower surface of the base 110 by a plating or deposition process.

As shown in FIG. 5, the connection electrodes 123 may connect the via holes 114 arranged adjacent to each other. The connection electrodes 123 may be formed on the lower surface of the base 110. The connection electrodes 123 may be formed on the lower surface of the base 110 by using the LDS method, like the sensor electrodes 120. The connection electrodes 123 and the second sensor electrodes 122 may be connected through the via holes 114.

A double layer (two-layer) structure in which RX electrodes and TX electrodes are formed on a first base and a second base arranged vertically may be used, but the manufacturing process of the double layer (two-layer) structure is complicated, and the productivity and durability of the double layer (two-layer) structure are relatively low. In addition, in the double layer (two-layer) structure, a material of an overlay cannot be selected because UV coating is performed on a base without attaching a separate overlay for protecting electrodes.

According to the embodiment of the present disclosure, it is possible to connect both RX electrodes and TX electrodes on a base having one layer. The RX electrodes and the TX electrodes are formed on one surface of the base, and the RX electrodes or the TX electrodes are connected to each other on the other surface of the base through via holes, which is also referred to as a 1.5 layer.

In the manufacturing process of the touch control device 100 according to the embodiment of the present disclosure, a laser is irradiated to the base 110, and the first sensor electrodes 121, the second sensor electrodes 122 and the connection electrodes 123 are formed by a plating or deposition process. Therefore, compared to a manufacturing process of the double-layered touch control device, the number of processes is greatly reduced, and thus the productivity can be greatly improved.

In the touch control device 100 according to the embodiment of the present disclosure, an overlay 140 may be attached to the upper surface of the base 110, and the overlay 140 may be made of any material having low conductivity. Accordingly, the overlay 140 exposed to the outside of the touch control device 100 may include various materials, which leads to an improvement in the degree of freedom of design. The overlay 140 may include materials capable of recognizing capacitive touch such as glass, acrylic, ABS, wood, stone, and the like. The materials listed above are merely examples and the materials of the overlay 140 are not limited as long as they are nonconductive materials capable of recognizing capacitive touch. However, it is preferable that the thickness of the overlay 140 is not too thick in consideration of the touch performance.

By providing the via holes 114, the overlay 140 can be uniformly attached to the upper surface of the base 110.

An adhesive layer 141 is disposed on the upper surface of the base 110 and then the overlay 140 is attached to the upper surface of the adhesive layer 141. Generally, air bubbles are generated between the overlay 140 and the adhesive layer 141 or between the adhesive layer 141 and the base 110 in a process of attaching the overlay 140. In order to remove the air bubbles, air is sucked from a side of the base 110, and the above-described attaching process is performed. However, if the upper surface of the base 110 has a curved surface shape of different curvatures, air bubbles are not easily removed even if air is sucked from the side of the base 110, which makes it difficult to uniformly attach the overlay 140 to the base 110.

According to the embodiment of the present disclosure, the plurality of via holes 114 may be formed at the touch area 111 of the base 110 and the plurality of via holes 114 may be formed through the upper and lower surfaces of the base 110. When the overlay 140 is attached, the plurality of via holes 114 becomes passages through which air bubbles can move. This solves the non-uniform adhesion problem of the overlay 140. Thus, the overlay 140 can be uniformly attached onto the base 110, which can lead to increased productivity and improved touch performance.

According to the embodiment of the present disclosure, the sensor electrodes 120 and the printed circuit board 131 are connected by simply contacting the base 110 and the printed circuit board 131 without fastening members. The sensor IC 133 is mounted on the printed circuit board 131 and the sensor electrodes 120 are connected to the sensor IC 133.

Specifically, the plurality of terminal portions 126 may be provided on the edge of the printed circuit board 131, and the plurality of terminal portions 126 may have a C CLIP structure.

A plurality of terminal engaging portions 132 may be provided on an inner side surface of the peripheral portion 112 of the base 110 and the plurality of terminal engaging portions 132 may be coupled to the plurality of terminal portions 126 of the printed circuit board 131.

The first terminal electrodes 124 to connect the first sensor electrodes 121 and the terminal portions 126, and the second terminal electrodes 125 to connect the second sensor electrodes 122 and the terminal portions 126.

The first terminal electrodes 124 are connected to the first sensor electrodes 121 through the via holes 114 and may extend from the lower surface of the base 110 to the terminal engaging portions 132.

The second terminal electrodes 125 are connected to the second sensor electrodes 122 through the via holes 114 and may extend from the lower surface of the base 110 to the terminal engaging portions 132.

The first terminal electrodes 124 and the second terminal electrodes 125 may be formed using the LDS method, like the sensor electrodes 120.

The first terminal electrodes 124 and the second terminal electrodes 125 may be formed on an upper surface and a side surface of the terminal engaging portions 132. The terminal portions 126 are in contact with the side surface of the terminal engaging portions 132. Therefore, the sensor electrodes 120 and the printed circuit board 131 are electrically connected by engagements of the terminal portions 126 and the terminal engaging portions 132.

As described above, in the touch control device 100 according to the embodiment of the present disclosure, the base 110 is coupled to the integrated circuit 130 including the printed circuit board 131 without fastening members. Conventionally, a robot solder process, which causes a decrease in productivity, was needed to connect the base and the printed circuit board. On the other hand, the touch control device 100 according to the embodiment of the present disclosure does not require the robot solder process, so productivity is improved and the manufacturing process can be simplified.

Figure 7:
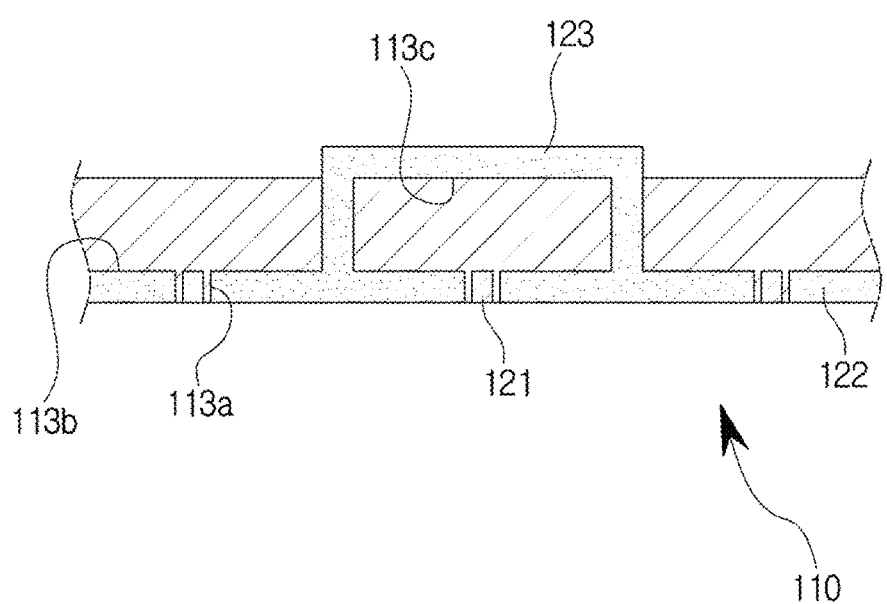
FIG. 7 is a cross-sectional view of a base of a touch control device according to another embodiment of the present disclosure.

FIG. 7 is a cross-sectional view of a base of a touch control device according to another embodiment of the present disclosure.

As shown in FIG. 7, according to another embodiment of the present disclosure, the sensor electrodes 120 may be formed on the lower surface of the base 110. The second sensor electrodes 122 may be formed on the lower surface of the base 110 and the connection electrodes 123 may be formed on the upper surface of the base 110. That is, the sensor electrodes 120 may be formed on the lower surface as well as the upper surface of the base 110.

Figure 8:
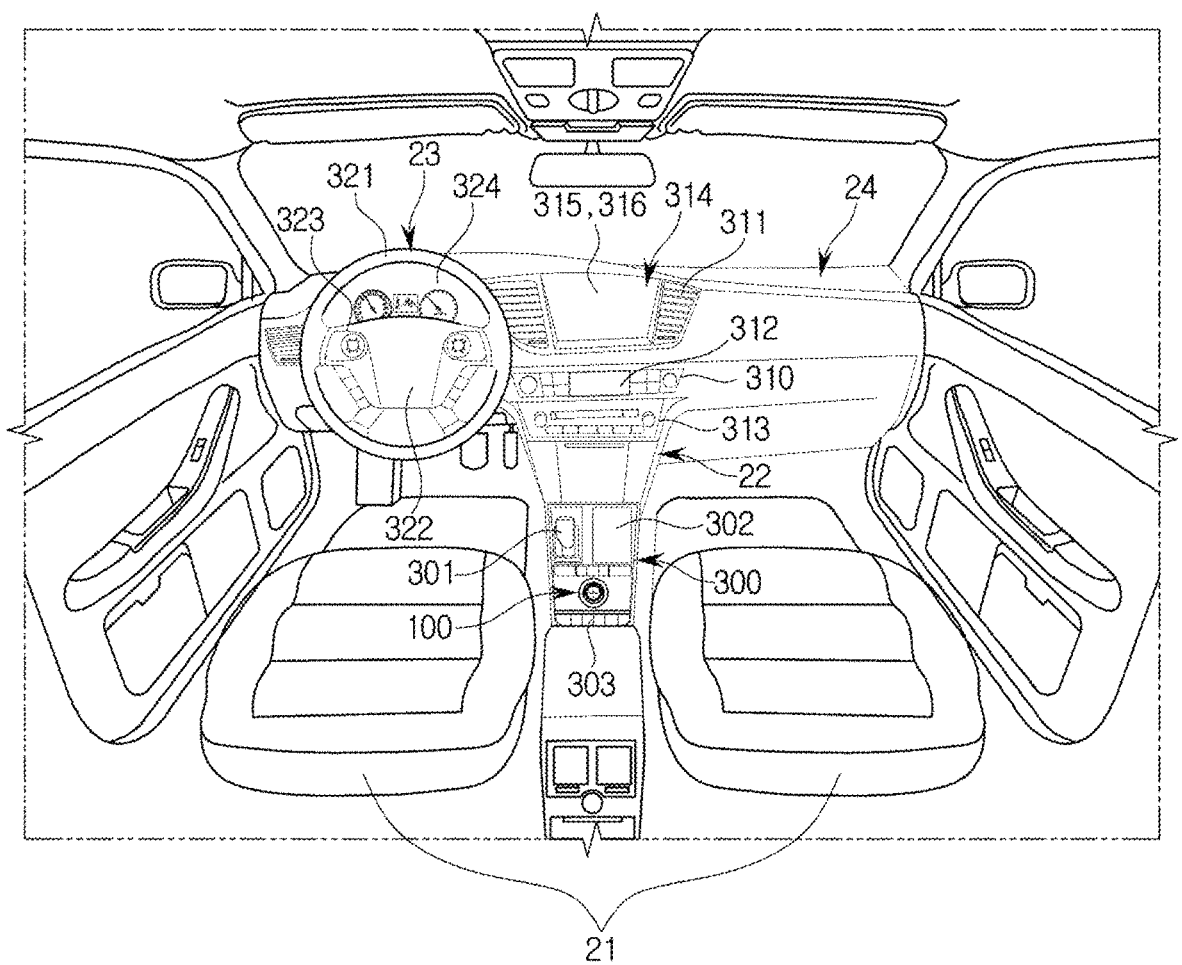
FIG. 8 is a view illustrating the interior of a vehicle equipped with the touch control device according to the embodiment of the present disclosure.

FIG. 8 is a view illustrating the interior of a vehicle equipped with the touch control device according to the embodiment of the present disclosure and FIG. 9 is a perspective view illustrating a gear box equipped with the touch control device according to the embodiment of the present disclosure.

Referring to FIG. 8, a vehicle 20 may include seats 21 reserved for a driver and passengers to sit on, a gearbox 300, a center fascia 22 and a dashboard 24 having a steering wheel 23.

In the center fascia 22, an air conditioner 310, a clock 312, an audio system 313, and an Audio, Video, and Navigation (AVN) system 314 may be installed.

The air conditioner 310 keeps the atmosphere inside the vehicle 20 pleasant by controlling the temperature, humidity, air cleanness, and air flow inside the vehicle 20. The air conditioner 310 may include at least one vent 311 installed in the center fascia 22 for venting air. There may also be buttons or dials installed in the center fascia 22 to control e.g., the air conditioner 310. The driver or the user may control the air conditioner 310 with the buttons arranged on the center fascia 22.

The clock 312 may be arranged around the buttons or dials that control the air conditioner 310.

The audio system 313 may include a control panel on which a number of buttons are mounted to perform functionality of the audio system 313. The audio system 313 may provide a radio mode for radio listening and a media mode for reproducing audio files stored in various storage media.

The AVN system 314 may be embedded in the center fascia 22 of the vehicle 20, or may be arranged out on the dashboard 24. The AVN system 314 is a system for comprehensively performing audio, video and navigation functions of the vehicle 20 according to the manipulation of the user. The AVN system 314 may include an input unit 315 for receiving user commands regarding the AVN system 314, and a display 316 for displaying a screen related to audio play, video play, or navigation functions. The audio system 313 may be omitted if it overlaps with the AVN system 314.

The steering wheel 23 is a tool to control a traveling direction of the vehicle 20, including a rim 321 to be held by the driver and a spoke 322 connected to a steering system of the vehicle 20 and connecting the rim 321 to a hub of a rotation shaft for steering. In the embodiment, a control device 323 may be formed on the spoke 322 to control various devices in the vehicle 20, e.g., the audio system.

The dashboard 24 may further include an instrument panel 324 for indicating various car information for the driver, such as the vehicle speed, traveled distance, engine revolutions per minute (rpm), amount of fuel remaining, temperature of coolant, various warnings, etc., and a globe box for containing various things.

The gearbox 300 may be installed between the driver's seat and the passenger seat inside the vehicle 20, and equipped with various control devices required to be manipulated by the driver while the driver is driving the vehicle 20.

Referring to FIG. 9, in the gearbox 300, a transmission lever 301 for transmission of the vehicle 20, a display 302 for controlling the vehicle 20 to perform functions, and buttons 303 for activating various devices of the vehicle 20 may be installed. In addition, the touch control device 100 in accordance with the embodiment of the present disclosure may be installed in the gearbox 300.

The touch control device 100 installed in the gearbox 300 may be positioned such that the user may be able to manipulate the touch control device 100 while keeping his/her eyes forward. For example, it may be located down the transmission lever 301. Alternatively, the touch control device 100 may be installed in the center fascia 22, in the steering wheel 23, in the passenger seat, or in the back seat.

The touch control device 100 may be connected to various display devices inside the vehicle 20 for selecting and executing various icons displayed in the display devices. The display devices installed inside the vehicle 20 may include the audio system 313 the AVN system 314, the instrument panel 324, or the like. Alternatively, the display 302 may be installed in the gearbox 300 if required. The display device may be connected to a Head-Up Display (HUD) device or a rear view mirror.

For example, the touch control device 100 may move a cursor or execute an icon displayed on the display device. The icon may include a main menu icon, a menu selection icon, a menu setting icon, etc. Furthermore, the user may operate GPS, or set driving conditions, or activate peripheral devices in the vehicle 20 through the touch control device 200.

According to embodiments of the present disclosure, a touch control device including a touch panel having a curved surface shape of different curvatures and a vehicle having the touch control device may be provided.

According to embodiments of the present disclosure, a touch control device having a touch panel with improved design freedom and a vehicle having the touch control device may be provided.

According to embodiments of the present disclosure, a touch control device with improved productivity by simplifying the manufacturing process and a vehicle having the touch control device may be provided.

According to embodiments of the present disclosure, a touch control device capable of uniformly bonding an overlay to a touch panel by removing bubbles generated between the touch panel and the overlay, and a vehicle having the touch control device may be provided.

According to embodiments of the present disclosure, a touch control device to which overlays of various materials can be attached and a vehicle having the touch control device may be provided.

Although certain embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A touch control device comprising:
a base including a metal complex;
via holes penetrating the base;
an electrode groove formed on an upper surface of the base, wherein the upper surface of the base includes a curved surface shape of different curvatures;
a plurality of sensor electrodes formed on the electrode groove and having a conductive material, the plurality of sensor electrodes including first sensor electrodes disposed on the upper surface of the base and directly connected to each other, and including second sensor electrodes disposed on the upper surface of the base and spaced apart from each other;

connection electrodes formed on a lower surface of the base;
an integrated circuit coupled to the base, disposed below the base, and connected to the plurality of sensor electrodes to sense a change in capacitance of the plurality of sensor electrodes;
an overlay configured to cover the upper surface of the base; and
a plurality of terminal engaging portions disposed on an inner side surface of a peripheral portion of the base,
wherein bubbles, generated between the overlay and the base, pass through the via holes,
wherein the connection electrodes and the second sensor electrodes are connected through the via holes,
wherein the connection electrodes include:
a first terminal electrode configured to connect the first sensor electrodes and the integrated circuit; and
a second terminal electrode configured to connect the second sensor electrodes and the integrated circuit, and
wherein the integrated circuit includes a printed circuit board and a plurality of terminal portions disposed on an edge of the printed circuit board to be coupled to the plurality of terminal engaging portions.

2. The touch control device according to claim 1, wherein the first sensor electrodes are connected along a first direction and the second sensor electrodes are separated along the first direction and a second direction crossing the first direction.

3. The touch control device according to claim 2, wherein the first sensor electrodes are disposed to cross the second sensor electrodes along the second direction.

4. The touch control device according to claim 1, wherein the electrode groove is a first electrode groove, and wherein the connection electrodes are formed in a second electrode groove formed on the lower surface of the base by a plating process or a deposition process.

5. The touch control device according to claim 1, wherein the overlay includes a non-metallic material.

6. A vehicle comprising:
the touch control device according to claim 1,
a display device and
a processor configured to operate the display device according to an input signal input to the touch control device.

7. The vehicle according to claim 6, wherein the touch control device is installed on at least one of a gear box, a steering wheel, and a center fascia.

8. A method for manufacturing a touch control device, the method comprising:
forming first electrode grooves and second electrode grooves by irradiating a laser on an upper surface of a base including a metal complex and via holes and including a curved surface shape of different curvatures;
forming first sensor electrodes including a conductive material on the first electrode grooves directly connected to each other and through a plating process or a deposition process;
forming second sensor electrodes including a conductive material on the second electrode grooves spaced apart from each other and through a plating process or a deposition process;
forming connection electrodes on a lower surface of the base;
attaching an integrated circuit to the lower surface of the base; and
attaching an overlay to the upper surface of the base,
wherein the base includes a plurality of terminal engaging portions disposed on an inner side surface of a peripheral portion of the base,
wherein bubbles, generated between the overlay and the base, pass through the via holes,
wherein the connection electrodes and the second sensor electrodes are connected through the via holes,
wherein the connection electrodes include:
a first terminal electrode configured to connect the first sensor electrodes and the integrated circuit; and
a second terminal electrode configured to connect the second sensor electrodes and the integrated circuit, and
wherein the integrated circuit includes a printed circuit board and a plurality of terminal portions disposed on an edge of the printed circuit board to be coupled to the plurality of terminal engaging portions.

* * * * *